United States Patent [19]
Miller

[11] 3,734,764
[45] May 22, 1973

[54] COATING COMPOSITIONS AND PROCESSES
[75] Inventor: Lewis S. Miller, Bellevue, Wash.
[73] Assignee: Weyerhaeuser Company, Tacoma, Wash.
[22] Filed: Nov. 30, 1970
[21] Appl. No.: 93,857

[52] U.S. Cl. ...117/93.31, 117/161 KP, 117/161 UB, 117/161 ZB, 204/159.23, 260/77.5 CR, 260/78.4 EP, 260/248 C
[51] Int. Cl. ................................................B44d 1/50
[58] Field of Search......................117/93.31, 161 KP, 117/161 UB, 161 ZB; 204/159.18, 159.23; 260/248 C, 78.4 EP, 77.5 CR, 2 EP

[56] References Cited
UNITED STATES PATENTS

| | | | |
|---|---|---|---|
| 3,326,710 | 6/1967 | Brodie | 204/159.23 |
| 3,551,235 | 12/1970 | Bassemir et al. | 204/159.23 |
| 3,367,992 | 2/1968 | Bearden | 260/837 |
| 3,297,745 | 1/1967 | Fekete et al. | 260/471 |
| 3,462,355 | 8/1969 | Griffith | 204/159.23 |
| 3,336,228 | 8/1967 | Fuchs et al. | 260/248 C |
| 3,050,413 | 8/1962 | Sites et al. | 117/93.31 X |

*Primary Examiner*—Alfred L. Leavitt
*Assistant Examiner*—J. H. Newsone
*Attorney*—Christensen, Sanborn & Matthews

[57] ABSTRACT

A carboxylic acid chloride or bromide, a sulfonyl chloride or bromide, cyanuric chloride, calcium hypochlorite or phosphorus oxychloride and optionally a buffering pigment are combined with a liquid, acrylate ester resin curable by exposure to high-energy ionizing radiation to yield a coating composition which upon being cured in air by exposure to ionizing radiation yields a coating having an essentially tack-free surface.

17 Claims, No Drawings

COATING COMPOSITIONS AND PROCESSES

BACKGROUND OF THE INVENTION

This invention relates to coating compositions curable by exposure to ionizing radiation, to a process for producing such compositions and to a method of producing coatings of such compositions on various substrates.

It is known that many polymerizable systems can be rapidly cured by exposing them to ionizing radiation such as high-energy electrons, alpha particles, gamma rays and X-rays. The use of ionizing radiation has a number of distinct advantages over conventional methods of effecting polymerization and cross-linking using catalytic agents, especially when used to cure coatings on wood and wood products, fabrics, rubber, glass, metal and similar substances. For example, it avoids the sometimes lengthy induction period associated with catalyst-induced curing, enables the use of coating compositions having indefinite pot lives, produces little temperature rise during curing and produces, in many cases, a superior coating-to-substrate bond. Many coatings can be cured in less than 1 second using high-energy electrons.

Unfortunately, however, when the uncured coatings are permitted to come in contact with the air, oxygen inhibition of curing by ionizing radiation often results in the surface of the coating being tacky or otherwise not as well cured as the bulk of the coating. Although the tacky material is present only in a very thin layer, i.e., on the order of $1 \times 10^{-3}$ to $1 \times 10^{-6}$ inches, this is sufficient to cause serious losses of coating gloss and problems with scratching. When coated articles such as wood panels are stored in a stacked relationship, blocking can also occur.

Undercured surfaces caused by oxygen inhibition of ionizing radiation curing can usually be avoided by covering the uncured film with an inert cover sheet or by maintaining the coating in an oxygen-free atmosphere until curing has been effected. These techniques, however, are often impractical and too expensive for commercial operations.

SUMMARY OF THE INVENTION

Coating compositions have now been invented which can be cured by exposure to ionizing radiation in air to yield coatings having surfaces which are essentially tack-free. These compositions comprise a (1) liquid acrylate ester resin curable by exposure to ionizing radiation and (2) from 0.1 to 10 percent by weight of said composition of an acidic halide soluble in or dispersible in said resin and selected from the group consisting of (a) compounds of the formula

where R is an aliphatic or aromatic group and X is Cl or Br; (b) compounds of the formula R'SO$_2$X where R' is an aromatic group and X is Cl or Br; and (c) cyanuric chloride, calcium hypochlorite and phosphorus oxychloride.

This invention is also directed to a method of coating a surface of a substrate comprising applying a composition of this invention to said surface and curing said composition by exposure to ionizing radiation.

DETAILED DESCRIPTION OF THE INVENTION

Acrylate ester resins exemplary of those used in this invention are those capable of being produced (1) by reacting a polyfunctional material selected from the group consisting of (a) dicarboxylic acids and dicarboxylic acid chlorides having from four to 15 carbon atoms, and (b) polyfunctional isocyanates having terminal, reactive isocyanate groups with a compound selected from the group consisting of 2-hydroxyalkyl acrylates and 2-hydroxyalkyl methacrylates or (2) by reacting a half-ester of a 2-hydroxyalkyl acrylate or 2-hydroxyalkyl methacrylate and a dibasic acid with a polyepoxide. These vehicles are described in detail in my U. S. application Ser. No. 721,152, filed April 15, 1968 (now U.S. Pat. No. 3,560,237), which application is incorporated herein by reference.

Other acrylate ester resins useful in the method and composition of this invention are the alpha-beta, olefinically unsaturated organic resins disclosed in U. S. Pat. No. 3,437,514, which is also incorporated herein by reference. These include unsaturated polyester resins, acrylic resins, modified-acrylic resins, urethane-modified organic resins, silicone-modified organic resins, and epoxy resins.

These acrylate ester resins can be used in this invention undiluted or dissolved in up to 50 percent by weight of a vinyl monomer. Preferably an acrylate monomer is used in combination with the vehicle to achieve optimum results. Small amounts of styrene, vinyl toluene, t-butyl styrene, chlorostyrene, hydroxyalkyl methacrylates or alkylmethacrylates having one to eight carbon atoms in the alkyl group and similar monomers can be used in admixture with the acrylate monomer; however, the presence of too great a quantity of the above compounds significantly lowers the cure rate of the vehicle and affects the properties of the cured coating.

Acrylate monomers which can be used include alkyl acrylates having from one to eight carbon atoms in the alkyl group, hydroxyalkyl acrylates, cycloalkyl acrylates, or glycidyl acrylates, such as 2-hydroxyethyl acrylate, 2-hydroxypropyl acrylate, glycidyl acrylate, cyclohexylacrylate, and others. It is preferred to use an acrylate monomer, such as n-butyl acrylate, which is readily available, economical, and has a low volatility. If the coating composition is to be applied to a porous substrate, the monomer, if used, should be added in an amount which does not thin the composition to an extent that it penetrates the substrate too rapidly. The addition of too much monomer also reduces the high impact and water resistance properties exhibited by these vehicles. Preferably, amounts up to 40 percent by weight or less are used.

The acidic halides useful in this invention must be soluble in or at least dispersible in the acrylate ester resin employed. Also, the acidic halide should not be excessively volatile; otherwise it may be lost from the coating composition before curing can be effected. Acryloyl chloride is one example of an acidic halide which is ordinarily too volatile for use in this invention. Exemplary of the carboxylic acid chlorides and bromides useful in this invention are those of the formula

wherein R is a saturated aliphatic group having from two to 18 carbon atoms, an unsaturated aliphatic group having from three to 18 carbon atoms and substituted and unsubstituted phenyl groups. Exemplary of sulfonyl chlorides and bromides which can be used are those of the formula $R'SO_2X$ wherein $R'$ is a phenyl, substituted phenyl, naphthyl or substituted naphthyl group.

Specific examples of the acidic halides useful in this invention are adipoyl chloride and bromide, sebacyl chloride, lauroyl chloride and bromide, terephthaloyl chloride, benzoyl chloride, benzene sulfonyl chloride, calcium hypochlorite and phosphorus oxychloride. Isophthaloyl chloride, 2-naphthalenesulfonyl chloride and cyanuric chloride are also exemplary and are preferred. Cyanuric chloride is especially preferred.

To prepare the coating compositions of this invention the acidic halide is merely dissolved or dispersed in the liquid acrylate ester resin. Grinding may, in some instances, be necessary to obtain rapid solution or dispersion. The acidic halide is ordinarily added in an amount ranging from about 0.1 to 10 percent, preferably 1 to 5 percent, by weight based on the weight of the total composition. However, when added in quantities greater than about 1%, some of the desirable properties of the cured coating composition may be detrimentally effected. This is thought to be caused by the organic acid and hydrogen chloride or bromide produced when the acidic halide reacts with traces of water present in the coating composition or in the substrate. With coatings applied to wood, darkening of the wood can also result. These detrimental effects can be effectively avoided by incorporating into the composition a buffering pigment capable of neutralizing the acids produced by the reaction of the acidic halide and water. Such pigments include, for example, calcium carbonate, titanium dioxide, zinc oxide, white lead ($2PbCO_3 \cdot Pb(OH)_2$) and litharge (PbO). Only small amounts of such pigments are ordinarily needed to counteract the acids produced, but such pigments are commonly used in paints and other coating compositions in amounts up to and even above 50 percent by weight.

The coating compositions of this invention can be used to coat any suitable porous or nonporous substrate such as wood or wood products, plastic, glass rubber and metals, etc. The properties of the resins are best utilized, however, in the coating of wood and wood products. Application can be accomplished by spraying, dipping, brushing or any other suitable means.

The expression "ionizing radiation" as used herein is intended to include both particulate radiation, such as highly accelerated electrons, protons, neutrons, alpha particles, deuterons and beta particles, and electromagnetic radiation such as x-rays and gamma rays. The dose of ionizing radiation necessary to cure a given coating will depend on the dose rate, temperature, and thickness and composition of the coating. Effective results are obtained, for example, by using high energy electrons of from 20,000 to 10,000,000 electron volts and dose rates of from 1 megarad per minute to 10 megarads per second. The use of an electron beam of sufficient voltage and intensity to penetrate the full thickness of the film and to effect curing in several seconds or less is preferred.

The following examples are provided by way of illustration only and are not intended to be in any way limiting of the invention. All parts and percentages are by weight.

EXAMPLE 1

A pigmented coating formulation is prepared from 17.5 parts of a vinyl ester resin prepared by reacting the half-ester condensation product of 2 moles 2-hydroxyethyl acrylate and 2 moles maleic anhydride with 1 mole bisphenol A diglycidyl ether; 17.5 parts of a vinyl ester resin prepared by reacting the half-ester condensation product of 2 moles 2-hydroxypropyl acrylate and 2 moles maleic anhydride with 1 mole n-butanediol diglycidyl ether; 15 parts of n-butyl acrylate; 31 parts titanium dioxide ("Unitane," a product of American Cyanamide Co.); and 19 parts calcium carbonate ("Snowflake," a product of Thompson-Weinman Co.). After dispersion of the pigment, a coating of this composition and a coating consisting of 95 parts thereof and 5 parts of cyanuric chloride are spread with a drawbar 0.005-inch thick onto the surface of medium density-overlaid plywood panels. Both coatings are irradiated in air under an electron accelerator having an 18-inch scan and set at 300,000 volts and 20 milliamps. After three passes at 60 ft. per min. (8.4 megarads total), both coatings are cured hard. Surface tackiness of the coatings is tested by pressing a sheet of tinfoil against the coated surfaces with the thumb and then stripping off the foil. The coating containing the cyanuric chloride gives no resistance to stripping, whereas the control coating adheres tightly to the foil. Like coated panels are also pressed face-to-face at a temperature of 60°C. Coatings containing the cyanuric chloride release without sticking, whereas the control coatings stick together.

EXAMPLE 2

A clear coating is prepared from 80 parts of a vinyl ester resin prepared by reacting the half-ester condensation product of 2 moles 2-hydroxyethyl acrylate and 2 moles maleic anhydride with 1 mole bisphenol A diglycidyl ether; 19.9 parts of n-butyl acrylate and 0.1 part of silicone ("Sag 47" produced by Carbide and Carbon Corp.). Coatings of this composition and one consisting of 95 parts thereof plus 5 parts of cyanuric chloride are spread with a drawbar 0.005-inch thick onto birch plywood panels. The coated panels are cured in air under the electron beam as in Example 1 using two passes at 50 ft. per min. (6.8 megarads total). Tinfoil pressed against the surface of the coating containing the cyanuric chloride releases with essentially no adhesion, whereas the foil adheres tightly to the control coating and requires considerable stripping force for removal.

EXAMPLE 3

Example 1 is repeated substituting 1 percent of the compounds listed in the following table for the cyanuric chloride. The surface tackiness to aluminum foil is rated numerically with "0" indicating no adhesion and "3" indicating adhesion equivalent to that of the coating containing no additives.

| Additive | Surface Tack Rating |
| --- | --- |
| None | 3 |
| Adipoyl chloride | 1 |
| Terephthaloyl chloride | 2 |
| Isophthaloyl chloride | 0 |
| Calcium hypochlorite | 2 |
| Benzenesulfonyl chloride | 1 |
| Cyanuric chloride | 0 |
| Lauroyl chloride | 1 |
| 2-Naphthalenesulfonyl chloride | 0 |

What is claimed is:

1. A coating composition comprising (1) a liquid acrylate ester resin which is curable by exposure to ionizing radiation and which, when so cured, is susceptible to inhibition of surface curing by atmospheric oxygen; and (2) from 0.1 to 10 percent by weight of said composition of cyanuric chloride.

2. The composition of claim 1 wherein the amount of cyanuric chloride is from 1 to 5 percent by weight.

3. The composition of claim 1 wherein said resin is produced (1) by reacting a 2-hydroxyalkyl acrylate or 2-hydroxyalkyl methacrylate with a polyfunctional material selected from the group consisting of (a) dicarboxylic acids and dicarboxylic acid chlorides having from four to 15 carbon atoms, and (b) polyfunctional isocyanates having terminal, reactive isocyanate groups; or (2) by reacting a half-ester of a 2-hydroxyalkyl acrylate or 2-hydroxyalkyl methacrylate and a dibasic acid with a polyepoxide.

4. The composition of claim 3 wherein the amount of cyanuric chloride is from 1 to 5 percent by weight.

5. In a method of coating a surface of a substrate comprising (1) applying on said surface a liquid coating composition comprising a liquid, acrylate ester resin which is curable by exposure to ionizing radiation and which, when so curing, is susceptible to inhibition of surface curing by atmospheric oxygen; and (2) curing the resulting liquid coating in the presence of atmospheric oxygen by exposing said coating to ionizing radiation; the improvement wherein said coating composition further comprises from 0.1 to 10 percent by weight of an acidic halide soluble in or dispersible in said resin, said acidic halide being selected from the group consisting of (a) compounds of the formula

where R is an aliphatic or aromatic group and X is Cl or Br; and (b) cyanuric chloride, calcium hypochlorite and phosphorus oxychloride, whereby the susceptibility of said composition to said inhibition is reduced or eliminated.

6. The method of claim 5 wherein curing of said liquid coating is effected by exposure thereof to high-energy electrons.

7. The method of claim 6 wherein said acidic halide is selected from the group consisting of adipoyl chloride, lauroyl chloride, terephthaloyl chloride, isophthaloyl chloride, cyanuric chloride, calcium hypochlorite and phosphorus oxychloride.

8. The method of claim 6 wherein said acidic halide is selected from the group consisting of cyanuric chloride, isophthaloyl chloride, calcium hypochlorite and phosphorus oxychloride.

9. The method of claim 6 wherein said acidic halide is cyanuric chloride.

10. The method of claim 6 wherein the amount of said acidic halide is from 1 to 5 percent by weight.

11. The method of claim 6 wherein said substrate is wood.

12. The method of claim 11 wherein said acidic halide is cyanuric chloride.

13. The method of claim 6 wherein said resin is produced (1) by reacting a 2-hydroxyalkyl acrylate or 2-hydroxyalkyl methacrylate with a polyfunctional material selected from the group consisting of (a) dicarboxylic acids and dicarboxylic acid chlorides having from four to 15 carbon atoms, and (b) polyfunctional isocyanates having terminal, reactive isocyanate groups; or (2) by reacting a half-ester of a 2-hydroxyalkyl acrylate or 2-hydroxyalkyl methacrylate and a dibasic acid with a polyepoxide.

14. The method of claim 13 wherein said acidic halide is cyanuric chloride.

15. The method of claim 14 wherein said substrate is wood.

16. In a method of coating a surface of a substrate comprising (1) applying on said surface a liquid coating composition comprising a liquid, acrylate ester resin which is curable by exposure to ionizing radiation and which, when so curing, is susceptible to inhibition of surface curing by atmospheric oxygen; and (2) curing the resulting liquid coating in the presence of atmospheric oxygen by exposing said coating to ionizing radiation; the improvement wherein said coating composition further comprises from 0.1 to 10 percent by weight of 2-naphthalenesulfonyl chloride, whereby the susceptibility of said composition to said inhibition is reduced or eliminated.

17. The method of claim 16 wherein curing of said liquid coating is effected by exposure thereof to high-energy electrons.

* * * * *